United States Patent [19]

Irwin

[11] Patent Number: 5,071,151

[45] Date of Patent: Dec. 10, 1991

[54] TAIL WHEEL AIRCRAFT DOLLY

[76] Inventor: Jack L. Irwin, 8298 Reid Rd., Swartz Creek, Mich. 48473

[21] Appl. No.: 464,540

[22] Filed: Jan. 16, 1990

[51] Int. Cl.$^5$ ............................................... B62B 1/18
[52] U.S. Cl. .................................. 280/402; 280/476.1; 280/47.24; 180/904; 414/428; 414/429
[58] Field of Search ..................... 280/402, 476.1, 79.4, 280/79.6, 47.17, 47.18, 47.23, 47.24, DIG. 6; 180/904; 244/50; 414/428, 429, 426, 490

[56] References Cited

U.S. PATENT DOCUMENTS

| | | | |
|---|---|---|---|
| 1,802,809 | 4/1931 | Funk | 280/47.23 |
| 1,902,834 | 3/1933 | Cohen-Venezian | 280/47.24 |
| 4,286,800 | 9/1981 | Lomas | 414/490 |
| 4,429,897 | 2/1984 | Friedman et al. | 280/47.24 |
| 4,854,803 | 8/1989 | Coccaro | 414/429 |

FOREIGN PATENT DOCUMENTS 2491852 4/1982 France ............................... 280/47.17

OTHER PUBLICATIONS

Danair, Bulletin No. 9226, May 1974.

*Primary Examiner*—Charles A. Marmor
*Assistant Examiner*—Mitchell Bompey
*Attorney, Agent, or Firm*—Weintraub, DuRoss & Brady

[57] ABSTRACT

A dolly particularly suitable for manipulation of tail wheel aircraft is disclosed as having a wheel and axle assembly with an elongated lever extending rearwardly from the axle. A wheel-holding assembly comprised of two arms forming an open rectangle extends from the lever. The wheel-holding assembly is fitted around the tail wheel of an aircraft without manipulation of the aircraft. A handle member is supplied at the end of the elongated lever to aid in manipulation and in lifting of the lever to remove the tail wheel of the aircraft from the ground so that the plane may be manipulated through the dolly. The dolly is also provided with a hitch assembly for use with tractor vehicles.

13 Claims, 1 Drawing Sheet

TAIL WHEEL AIRCRAFT DOLLY

BACKGROUND OF THE INVENTION

1. Field of the Invention

The present invention relates generally to manual dollys. More specifically, the present invention relates to an aircraft dolly having particular utility for the manipulation of tail wheeled aircraft.

2. Description of the Related Art

There are known several manual dolly configurations suitable for general purpose use.

U.S. Pat. No. 4,505,489 to Specie discloses a dolly system for campgrounds and having particular utility for the moving of picnic tables and the like. An elongated handle member is journaled to each separate axle of a pair of spaced apart wheels. An elongated lifting member connected to the elongated handle extends forwardly of the wheels and contains a U-channeled brace thereon for fitting under the cross brace of a picnic table. The operator pushes down on the dolly in the conventional manner to lift the object to be moved and steers the dolly from a cross-bar linking two parallel spaced apart elongated handle members.

U.S. Pat. No. 3,799,582 to Courtright discloses a wheel cradle structure for use with agricultural irrigation lines. The Courtright reference is not a levered dolly system but shows a cradle capable of suspending a wheel off of the ground. The cradle is axially suspended between two wheels and may be connected in series with like cradles through linkage arms contained on either side of the cradle. The operative wheel support members of Courtright extend at right angles to the axles of the cradle wheels.

U.S. Pat. No. 3,456,960 to Rector discloses a two-wheeled hand cart having carrying tines which fold up against the hand cart frame. Lift for the object to be carried is supplied in the conventional manner by pushing down on the elongated handle members of the hand cart. The carrying tines of the Rector invention extend at right angles to the wheel axle.

U.S. Pat. No. 3,306,624 to Goss discloses a dolly for moving boxes of glass. The Goss invention discloses a carrying base which is tipped forwardly to fit under a lower edge of a glass piece and then force is applied downwardly on the handle to bring the glass sheet to the horizontal. The glass sheet is balanced between two elongated handle members serving as levers for the carrying base.

U.S. Pat. No. 1,241,418 to Mosher discloses a collapsible automobile dolly. Mosher discloses two roller wheels supported by a central axle. Disclosed on the central axle are support members for holding an automobile axle or axles off the ground. An elongated tilt bar extends from the central axle.

None of the above inventions disclose any utility for moving a wheeled craft such as a tail wheel airplane by surrounding a wheel thereof with lifting arms extending parallel to the axle from an elongated lever. Further, the disclosed dolly systems all rely on a downward force placed on the lever to lift the object to be moved thus placing strain on the back and shoulders and making steering of the object more difficult.

Also, in using a downward force, the operator's body weight is counterbalanced by the object lifted, thus tending to lift the operator, resulting in less traction between the operator and the ground. Such a traction loss can be inconvenient or even dangerous on loose surfaces, such as gravel, when the operator is "manually" operating a dolly.

There are known prior aircraft dollys operating in a manner similar to the known dollys, which require the operator to physically lift the aircraft onto the carrying platform of dolly. As there are often no convenient lift points or pushing surfaces located on an aircraft there exists the need to provide for a lifting dolly which can be placed around the aircraft wheel without manipulation of the aircraft itself, and thereby lift the wheel providing in effect a wheeled handle for manipulation of the aircraft by pushing or pulling. It is further desirable to provide such an aircraft dolly which derives its lifting force from a lifting of the lever as can be done with the strong leg muscles of the operator, as in proper lifting technique, thereby preventing body strain on the operator and making the aircraft easier to steer during manipulation thereof. The present invention provides a dolly system having these advantages and which is further capable of being easily stored. A dolly according to the present invention is constructed so as to minimize the possibility of the aircraft loosening itself from the constraints of the dolly.

There is also known a tail wheel aircraft tow bar. U.S. Pat. No. 4,659,124 discloses a hand carried tow bar for tailwheel aircraft having an elongated bar with clamping jaws at an end thereof. The jaws are clamped around a tail spring of the aircraft and the operator manipulates the aircraft by pulling, or less effectively, pushing, on a handle located at a second end of the bar. The tail spring of the aircraft must having a strongly vertical orientation and generous clearance beneath the aircraft tail for this tow bar to be effective. The clamping force of the jaws and subsequent manipulation of the aircraft through the tailspring might tend to cause premature metal fatigue in the tailspring. Turning of the aircraft using this tow bar requires great effort against the tail spring to force the craft against normal wheel friction instead of using the wheels to pivot the craft. The design of this tow bar also requires relatively elaborate machining and/or casting of its component parts. Use of this tow bar presents the possibility of injurious contact to the aircraft from the tow bar. Further, an individual tow bar of this type is not readily adaptable for use with a wide range of tail spring sizes.

Obviously then there exists a need for a tail wheel aircraft manipulator mechanism which eliminates these drawbacks in the current art. The present invention not only solves the aforementioned problems of the current art but is also readily adaptable for use with nose wheel aircraft.

SUMMARY OF THE INVENTION

An aircraft dolly is disclosed which generally comprises:
(a) an axle,
(b) a wheel rotatably attached to the axle,
(c) an elongated lever attached to the axle, the elongated lever extending rearwardly from the axle, and
(d) a wheel-holding assembly attached to the lever and having spaced apart arms extending from the lever and substantially parallel to the axle, wherein the arms receive a wheel therebetween.

A particularly advantageous feature of the present invention is an axle mounted lever carrying thereon an aircraft wheel-holding assembly capable of being placed about an aircraft wheel without manipulation of the aircraft. The lever is attached to the axle at some point along the length of the lever. The lever may extend forwardly of the axle in certain applications, e.g., a motorized dolly, should it be found desirable to locate the wheel holding assembly forwardly of the axle. The lever will, of course, still extend rearwardly from the axle to provide the operator with a necessary location on the device for manipulating the aircraft.

For manual operation, the lever preferably has a first section extending steeply downward from the axle and an elongated second section extending rearwardly therefrom. The wheel-holding assembly will preferably be located proximal to the juncture of the first and second sections and have a void between the spaced apart arms so that the arms may be fitted about the lower portion of the tail wheel of the aircraft. The elongated lever then merely has to be lifted to raise the tail wheel of the aircraft off the ground, thus supporting the aircraft on the dolly. The aircraft may then be rolled on dolly wheels by pushing or pulling on the handle.

A rotating sleeve may be provided on the rear wheel-holding assembly arm in order that the tail wheel may rotate thereon during a sharp push or pull on the lever thereby preventing the tail wheel of the aircraft from leaving the wheel holding assembly. Should the wheel-holding assembly be located forwardly of the axle, a rotating sleeve may be supplied on the forward wheel-holding arm to prevent errant movement of the tail wheel. Alternatively, the aircraft wheel may be lashed to the dolly to prevent wheel movement.

The first end of the lever is preferably attached to the axle off of the longitudinal center of the axle. This location will place the midline of the wheel-holding assembly, as it extends from the lever, substantially in line with the center of the axle thereby providing good control for the manipulation of the aircraft.

Provision is conveniently made for adjusting the distance between the spaced apart arms of the wheel-holding assembly in order to accommodate various sized tail wheels as would be found on different makes of aircraft.

A handle which has both horizontal and vertical members, ordinarily is attached to the second end of the lever. The vertical members extend upwardly to make the lever easily manipulatable as the lever is generally operated close to the ground when placing the dolly under the aircraft. Horizontal members are also provided for ease of lifting and manipulation of the aircraft. A trailer hitch attachment may also be used separately or in conjunction with the manual handle should the operator desire to attach the dolly to a separate motive force such as a lawn tractor.

Other attendant advantages will be more readily appreciated as the same becomes better understood by reference to the following detailed description and considered in connection with the accompanying drawings in which like reference numerals designate like parts throughout the figures.

DESCRIPTION OF THE PREFERRED EMBODIMENT

Figure 1:
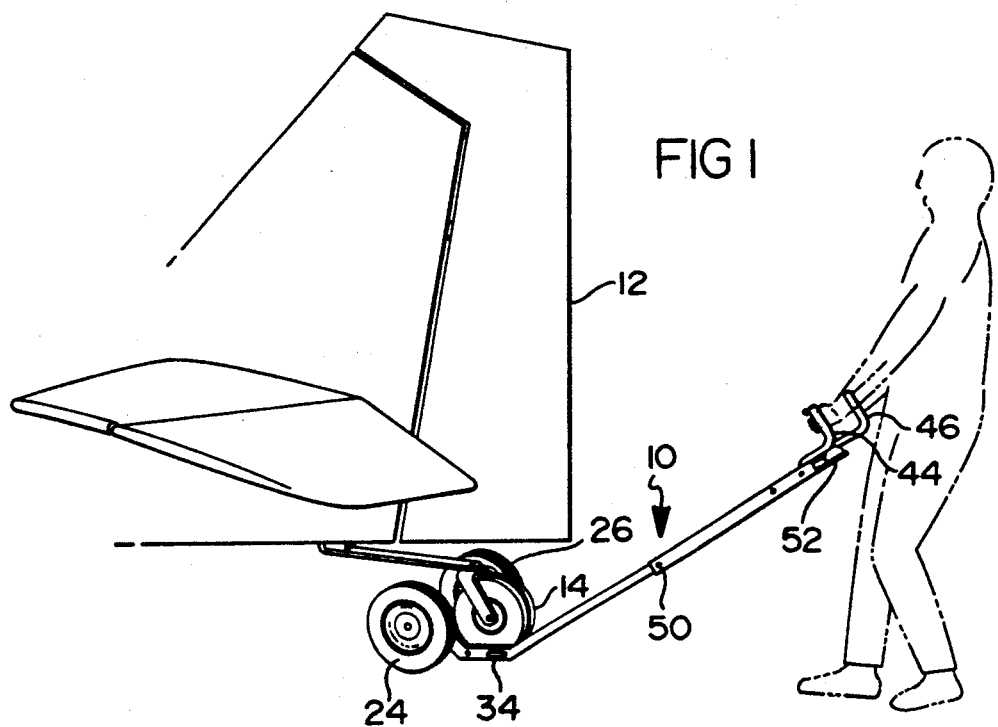
FIG. 1 is a perspective view of a device according to the present invention shown in environment operating on the tail wheel of an aircraft.

As seen in FIG. 1, a dolly 10 especially suitable for the manipulation of a tail wheel aircraft 12 is fittable beneath the tail wheel 14 of an aircraft for the lifting of the aircraft 12 so that the dolly 10 supports the aircraft 12 for manipulation thereof by the dolly 10.

The dolly 10 of the present invention will be described in its quiescent state, i.e., detached from the aircraft 12 and resting upon the ground in a position ordinarily ready for use. Positional words such as up, down, right, left, front, rear, etc. will be used in their ordinary sense as derived from an operator standing behind the dolly 10 at a handle thereof with the wheel and axle being at the front, or forward end of the dolly, as seen in FIG. 1.

Figure 2:
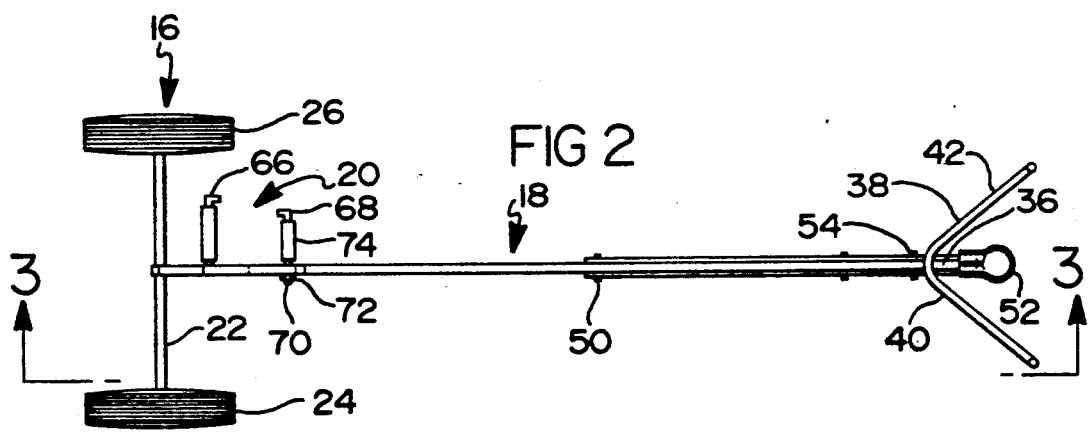
FIG. 2 is a top plan view of a device according to the present invention.

As seen in FIG. 2, the dolly generally comprises an axle and wheel assembly 16, a lever 18, and a wheel-holding assembly 20.

At the forward end of the dolly is an axle 22 to which is rotatably mounted a first wheel 24 and a second wheel 26.

Attached to the axle 22 at a point off center between the two wheels 24, 26 is a lever, indicated generally at 18. The lever 18 is located off center of the axle 22 so as to place the wheel-holding assembly 20 generally over the midline of the axle 22 between the two wheels 24, 26. This will generally stabilize the load and make the dolly 10 easier to manipulate when under load.

Figure 3:
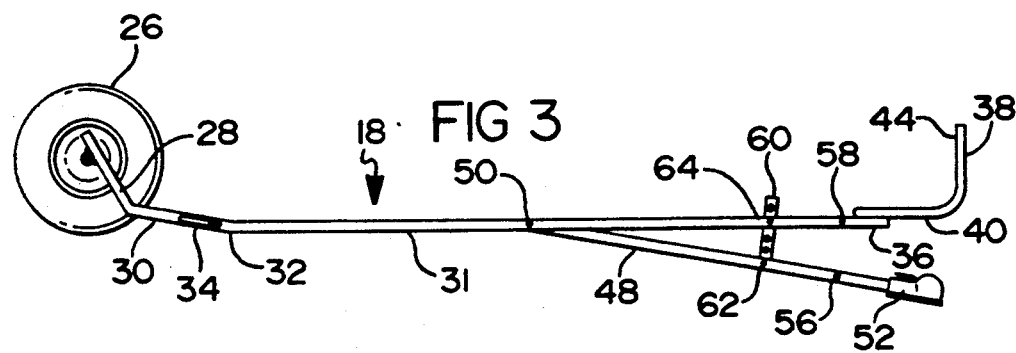
FIG. 3 is a side view of a device according to the present invention taken along line 3—3 of FIG. 1.

As seen in FIG. 3, the lever 18 of the preferred embodiment comprises a first section 28 attached to the axle by welding or the like and extending at a steep angle towards the ground for a length approximately the radius of the wheels 24, 26. Extending rearwardly from the first lever section 28 is a second lever section 30. The second lever section 30 travels rearwardly at a slight angle to the ground until meeting the ground. A third lever section 31 then angles upwardly therefrom at a slight angle to the ground while traveling rearwardly for such a distance as to establish reasonable leverage for the dolly 10 as further explained below. A throughhole 34 is bored transverse to the longitudinal axis of the lever 18 in the lever second section 30 forward of a pivot point 32, for reasons explained below.

Alternatively, the lever 18 could, of course, extend rearwardly with only one bend at the pivot point 32, or entirely without bends. The nonbent lever arrangement would, of course, necessitate structural modification of the wheel holding assembly 20 to keep the placement of the wheel holding area of the wheel-holding assembly as close to the ground as possible. Further, it is envisioned that lever 18 may extend forwardly of the axle 22 where forward placement of the wheel-holding assembly 20 is desired; such as may be the case for a powered dolly or with certain makes of aircraft.

As seen in FIG. 2, at a second, or rearward, lever end 36 is attached a V-shaped handle 38 extending rearwardly from the second lever end 36 having first and second horizontal handle members, 40 and 42 respectively as seen in FIG. 1. Extending upwardly from the respective horizontal handle members 40, 42 are first and second vertical handle members, 44 and 46 respectively. The vertical handle member 44, 46 provide for ease of manipulation of the dolly 10 near the ground to lessen the backbending or stooping of the operator when positioning the dolly for use as further explained below. The horizontal handle members 40, 42 provide readily graspable lifting and steering surfaces when the dolly is in use.

A yoke 48 is pivotally attached at a point approximately midway along the length of the second lever section 30 by a yoke pivot pin 50. The yoke 48 extends rearwardly along the third lever section 31 to end between V-shaped horizontal handle members 44, 46 at a hitch 52. Yoke 48 may be constructed from a U-channel bracket, or from parallel arms extending on either side of the third lever section 31. The yoke 48 is secured about the lever 18 in convenient position by placing a pin 54 through holes 56 and 58 respectively, drilled transversely in both the yoke and third handle section. Hitch 52 will then be located unobtrusively between the horizontal members of the handle 42.

As seen in FIG. 3, the yoke 48 and attached hitch 52 may be angled downwardly from the lever third section 31 by releasing a perforated yoke support 60 which is an armature having a series of holes therethrough. The yoke support 60 is pivotally connected at a first end thereof to yoke 48 by a yoke support pivot 62. The yoke 48 is fastened at a second end thereof to the lever 18 by the pin 54 through a yoke support throughhole 64 in lever 18. The yoke 48 and the hitch 52 may be placed lower than the handle 38 for additional lift of the lever 18 when attaching the lever to a tractor vehicle through the hitch 52. Although illustrated as a ball hitch, hitch 52 may comprise various types of hitch arrangements. The perforated yoke support 60, yoke pivot pin 50 and associated pins and throughholes together provide a means for securing the yoke 48 at an angle to the lever 18.

As seen in FIGS. 2 and 3, the wheel-holding assembly 20 comprises a first arm 66 and second arm 68 extending laterally from lever 18 towards the midline of the axle 22. The first arm 66 and the second arm 68 are "L"-shaped members having the short legs of the "L's" pointed towards each other to form a substantially open rectangular wheel-holding assembly 20. The wheel holding assembly 20 may thus be placed about the tail wheel 14 without manipulation thereof.

The first arm 66 is affixed to the lever 18 at the junction of the first lever section 28 and second lever section 30. The second arm 68 is selectively located in the throughhole 34 located along the forward section of second lever section 30, dependant upon the size of the tail wheel 14 to be secured, thus making the dolly 10 easily adaptable to a wide range of aircraft.

As an alternative to the throughhole 34, which is a transverse channel formed through lever 18, a series of fixed throughholes may be provided for a variable adjustment of the second arm 68. The second arm 68 is fastened to the lever 18 by placing a threaded end 70 of the second arm 68 through the throughhole 34 of the lever 18 and securing the second arm therein by means of a bolt 72.

The first arm 66, being located at the juncture of the first and second lever sections, 28 and 30 respectively, is therefore placed higher on the lever 18 than the second arm 68. The first arm 66 also extends farther towards the midline of the axle than does second arm 68. These two features aid in the positioning of the wheel-holding assembly 20 around the tail wheel 14 when manipulating the dolly 10 into an operative position.

A sleeve 74 is fitted loosely over second arm 68 so as to be rotatable thereon. The sleeve 74 will provide a rolling surface for the tail wheel 14 in order to prevent the tail wheel 14 from escaping the wheel-holding assembly 20 should a sharp forward push be given to the dolly 10 when transporting the aircraft 12. The first arm 66 can also be fitted with a rolling sleeve especially in those embodiments where the wheel-holding assembly 20 is carried forward of the axle 22. In the preferred embodiment the first arm 66 is located less than the diameter of a wheel away from the axle 22 thereby allowing the axle 22 to act as a forward stop to the tail wheel 14 should a sharp pull on the dolly 10 dislodge the tail wheel 14 from the wheel-holding assembly 20.

In use, the dolly is rolled diagonally forward of the tail wheel 14 thus avoiding possible contact with the sensitive aircraft tail mechanism. The wheel-holding assembly 20 is then pulled towards the tail wheel 14 to a position where first arm 66 is approximately in front of the tail wheel 14. The lever 18 is then pivoted on the pivot point 32 to lift the wheels 24, 26 off the ground while pivoting wheeling-holding assembly 20 under and around the tail wheel 14. Once the wheel-holding assembly 20 is in proper position around the tail wheel, the operator simply lifts upwardly on the lever 18 at the handle 38. The leverage of the handle will easily lift the tail wheel 14 and aircraft 12 off of the ground whereby the aircraft may then be rolled on dolly wheels 24 and 26 and steered by handle 38. Because the aircraft tail is supported on the spaced apart wheels, pivoting of the tail is easily accomplished. Also, because the tail wheel 14 is the only component of the aircraft 12 to be touched by the dolly 10, the possibility of damage to the aircraft from contact with dolly is substantially decreased.

Should the operator wish to use a tractor device to tow the aircraft, the wheel-holding assembly is positioned around the tail wheel as per above. Then the yoke 48 is detached from lever 18 by removal of the pin 54. Hitch 52 is then attached to a tractor hitch assembly (not shown) and the proper angle is selected between yoke 48 and lever 18 and the yoke secured at that angle by pinning the perforated yoke support 60 in place through the yoke support throughhole 64 in lever 18.

The current invention thus provides a simple and efficient means for manipulating tail wheel aircraft with minimal strain to a manual operator. It will be realized that the present invention may be equally applicable to the manipulation of nose wheel aircraft, especially those not having aerodynamic skirts located around the nose wheel.

Having, thus, described the invention, what is claimed is:

1. An aircraft dolly comprising:
   (a) an axle;
   (b) at least one wheel rotatably attached to the axle;
   (c) an elongated lever having a first section attached to the axle, the elongated lever having a second section extending rearwardly from the axle, a handle member being disposed upon the second section, and
   (d) a wheel-holding assembly attached to the lever, the assembly comprising a plurality of spaced apart arms located rearwardly from the axle, the arms being disposed on and extending from the lever, the arms being substantially parallel to the axle, the arms being disposed along the length of the lever intermediate the axle and the handle member, and wherein the arms receive an aircraft wheel therebetween.

2. The dolly of claim 1 wherein a midline of the wheel-holding assembly is substantially coplanar with a midline of the axle.

3. The dolly of claim 1 wherein:
the spaced apart arms have a gap therebetween enabling the arms to be placed around a wheel without manipulation of the wheel.

4. The dolly of claim 3 wherein the spaced apart arms are L-shaped in at least one plane.

5. The dolly of claim 1 wherein the elongated lever has first and second sections,
the first section having a first end attached to the axle and extending steeply therefrom towards the ground;
the second section being coplanar with the first section and extending rearwardly therefrom and ending in a second lever end.

6. The dolly of claim 3 wherein the arm proximal to the axle is greater in length than the arm distal to the axle.

7. The dolly of claim 3 further comprising a sleeve rotatably surrounding at least one arm.

8. The dolly of claim 3 wherein the arm proximal to the axle is located higher on the lever than the arm distal to the axle when the lever is quiescent.

9. The dolly of claim 1 wherein the lever is attached coincident with a midline of the axle.

10. The dolly of claim 1 further comprising means for adjusting the distance between the spaced apart arms.

11. The dolly of claim 4 further comprising:
(a) a yoke pivotally attached at a point approximately midway along the length of the second section of the lever, and
(b) a trailer hitch formed integrally with the yoke.

12. The dolly of claim 11 further comprising a yoke pivotally attached at a first end thereof to the lever, and means for securing the yoke at an angle to the lever, and, the yoke attached at a second end thereof to the trailer hitch.

13. The dolly of claim 12 wherein the securing means further comprises a perforated support member pivotally attached to the yoke at one end and securable to the lever at a another end.

* * * * *